United States Patent
Waxman et al.

(10) Patent No.: US 9,654,638 B2
(45) Date of Patent: May 16, 2017

(54) METHOD AND SYSTEM FOR DETERMINING CUSTOMER'S SKILL, KNOWLEDGE LEVEL, AND/OR INTEREST

(71) Applicant: Avaya Inc., Basking Ridge, NJ (US)

(72) Inventors: Harvey S. Waxman, Holmdel, NJ (US); Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 135 days.

(21) Appl. No.: 13/953,424

(22) Filed: Jul. 29, 2013

(65) Prior Publication Data

US 2015/0030152 A1    Jan. 29, 2015

(51) Int. Cl.
*H04M 3/523* (2006.01)

(52) U.S. Cl.
CPC .... *H04M 3/5233* (2013.01); *H04M 2203/551* (2013.01)

(58) Field of Classification Search
CPC .. H04M 3/493; H04M 3/5166; H04M 17/205; H04M 2242/08; H04M 3/5232; H04M 3/5233; H04M 2203/551
USPC ............ 379/265.01, 265.02, 265.05, 265.11, 379/265.12, 265.13, 266.01, 266.07; 705/14.1, 14.11, 14.12, 14.13, 14.14
See application file for complete search history.

(56) References Cited

U.S. PATENT DOCUMENTS

| | | | |
|---|---|---|---|
| 8,340,277 B2 | 12/2012 | Kradjel et al. | |
| 8,363,796 B2 | 1/2013 | Adkar et al. | |
| 8,634,543 B2 | 1/2014 | Flockhart et al. | |
| 8,964,958 B2 | 2/2015 | Steiner | |
| 2002/0142815 A1* | 10/2002 | Candelore | 463/1 |
| 2003/0187732 A1* | 10/2003 | Seta | 705/14 |
| 2006/0064637 A1* | 3/2006 | Rechterman | G06F 17/30905 715/205 |
| 2007/0025540 A1* | 2/2007 | Travis | 379/219 |
| 2010/0235218 A1 | 9/2010 | Erhart et al. | |
| 2011/0125793 A1 | 5/2011 | Erhart et al. | |
| 2011/0125826 A1 | 5/2011 | Erhart et al. | |
| 2013/0051544 A1* | 2/2013 | Ross et al. | 379/265.02 |
| 2014/0244398 A1* | 8/2014 | Wasilewski | G06Q 30/0269 705/14.66 |

\* cited by examiner

*Primary Examiner* — Antim Shah
(74) *Attorney, Agent, or Firm* — Sheridan Ross P.C.

(57) ABSTRACT

A microprocessor executable work assignment mechanism selects a work item associated with a customer, dynamically determines, for the customer, a customer proficiency level with respect to a contact center product and/or product area sold and/or serviced by a contact center, and uses the customer proficiency level in assigning the selected work item to a resource for servicing and/or in providing the determined customer proficiency level to an assigned resource for use in servicing the selected work item.

20 Claims, 5 Drawing Sheets

| 200 | 204 | 208 | 212 | 216 | 220 | 224 | 228 | 232 | 236 |
|---|---|---|---|---|---|---|---|---|---|
| CUSTOMER IDENTIFIER | CUSTOMER PERSONAL INFO. | CUSTOMER BUSINESS HISTORY | CUSTOMER TRANS. HISTORY | SCRIPT ID | CUSTOMER RESPONSES | CUSTOMER PROFICIENCY LEVEL(S) | CUSTOMER INTERESTS | ITEMS ASSOC. WITH WORK ITEM | PRIOR EARNED INCENTIVES |
| ••• | ••• | ••• | ••• | ••• | ••• | ••• | ••• | ••• | ••• |

FIG. 2

METHOD AND SYSTEM FOR DETERMINING CUSTOMER'S SKILL, KNOWLEDGE LEVEL, AND/OR INTEREST

FIELD

The disclosure relates generally to contact centers and particularly to collecting customer information in contact centers.

BACKGROUND

A contact center manages all client contacts of a business or other entity through a variety of mediums, such as telephone, fax, letter, video, webforms, e-mail and, increasingly, online live chat. Distinct from call centers, that purely handle telephone correspondence, contact centers have a variety of roles that combine to provide an all encompassing solution to client and customer contact.

Contact centers have many different configurations.

A common type of contact center employs queues of contact center agents and work items and complex work assignment algorithms to provide optimal customer service. For example, in skill-based queues a work item queue is paired with a corresponding resource queue. When work items are received at the Automated Contact Distributor (ACD), the attributes of the work item are analyzed, and the work item is placed in a specific queue based on its attributes. Similarly, when a contact center resource (often an agent) comes on line they are assigned to one or more resource queues that also have a corresponding skillset associated therewith. Since skill queues are provided in work item/resource pairs, the next available agent in a resource queue is assigned the next work item waiting in the work item queue.

To improve efficiency, a contact center will typically segment contacts into many different queues. This segmentation may be by service, language, media type, region, and/or customer type. This can quickly result in many thousands of queues. Each of these queues needs to be configured, managed, monitored and reported on. Also, as agents gain new skills and improve their expertise levels, there is a need to constantly reassign agents to queues. Furthermore, when an agent gains new skills there is a significant cost in administration and operational costs of the contact center. Complexity increases because agents are typically in multiple queues simultaneously, and the new skills of an agent need to be updated in all relevant queues. Updating these changes in agent skills is a time-consuming and expensive task, which usually has to be performed with some amount of manual oversight. All of these factors add significant complexity and cost to the running of the center.

To address these issues, a queueless contact center has been developed. A queueless contact center discards queues and uses pools of resources, work items and qualifier sets and creates a qualification bit map for each pool. One-to-one optimal matching of work items and resources can be achieved by determining which resources are qualified to be assigned to a selected work item, which qualified resources are eligible to be assigned to the selected work item, and which eligible resources are most suitable to be assigned to the selected work item. The bit maps can enable ultra-fast mapping to determine which of the various resources is most suitable to be assigned to the selected work item.

The various contact center configurations face common challenges. Many potential customers in a wait queue to interact with a live agent often disconnect when they regard the time spent "on hold" as unproductive. To maintain customer interest while in queue, many contact centers play pre-recorded music and/or pre-recorded voice announcements that describe the company's products or services and/or tell the customer that his or her call is important. When customers are finally connected to an agent, the agent may spend valuable time gaining an understanding of the customer's skill and knowledge levels to respond appropriately to a customer's needs. Contact centers attempt to address this problem by acquiring information about the customer's needs via a traditional Interactive Voice Response ("IVR") script. Other customer information may be inferred by mapping data obtained automatically by the contact center (such as caller ID or browser cookies) to records in a database.

These techniques can be annoying to customers rather than entertaining and rewarding. Particularly with customers having no prior transaction history with a contact center or enterprise, the current methods can do a poor job identifying the customer's skill and knowledge levels prior to establishing contact with an agent.

SUMMARY

These and other needs are addressed by the various aspects, embodiments, and/or configurations of the present disclosure. The present disclosure is directed generally to routing work items to contact center resources for servicing based on a customer proficiency level with a selected domain.

A microprocessor executable work assignment mechanism can:

(a) select a work item associated with a customer;

(b) dynamically determine, for the customer, a customer proficiency level with respect to a contact center product and/or product area sold and/or serviced by a contact center; and (c) use the customer proficiency level to assign the selected work item to a resource for servicing and/or provide the determined customer proficiency level to an assigned resource for use in servicing the selected work item.

The work item can be a real-time or pseudo-real-time contact.

The contact center resource assigned to service the work item is typically a human agent.

The customer proficiency level can be determined by executing a script while the customer is awaiting service by an agent. The script can be configured as a trivia game, and the customer can receive a benefit for answering a selected number of questions correctly.

Based on at least one of contact center performance information, a contact center goal and/or policy and/or objective, and work item information, the work assignment mechanism can determine one or more of: (a) whether or not to perform the dynamically determining step; (b) an identity of a script to be executed; (c) a configuration of the script; and (d) a benefit given to the customer for completing successfully questions provided by the script.

The contact center performance information can include one or more of a queue length, available resource, and contact center performance metric, and the work item information can include one or more of an identifier of a script successfully completed by the customer, a prior response of the customer to a script, a customer proficiency level, a contact center product associated with the selected work item, and a prior earned incentive.

For example, the determination can be based on a selected contact center product currently being marketed by the contact center.

The present disclosure can provide a number of advantages depending on the particular aspect, embodiment, and/or configuration. The system and method of this disclosure can more effectively use customer wait or idle time, while waiting to be serviced, to entertain customers while concurrently collecting valuable work item information regarding particularly a customer proficiency level within a defined domain. Because customers may be rewarded for correct answers with coupons, discounts, and other incentives, the system and method of this disclosure can reduce the likelihood that customers will regard their time on-hold as unproductive. Unlike typical Interactive Voice Response ("IVR") unit applications that attempt to identify why a customer is calling, the system and method of this disclosure can allow reasonable inferences to be made about the customer's level of skill and/or knowledge and/or interests. This information can form the basis of a customer profile useful to the contact center in different ways. The rewards that are offered or given for correct answers or responses to the script (e.g., trivia contest) can be slanted towards preferences suggested by the profile. The profile can be used by contact center mechanisms that route customers to agents having the appropriate skill set. The profile and profile-based recommendations can be provided to the agent, thereby allowing the agent to customize responses and offers. The trivia questions can be focused on contact center products not only to determine a level of customer proficiency about the products but also to educate the customer about the features of the products.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

"A" or "an" entity refers to one or more of that entity. As such, the terms "a" (or "an"), "one or more" and "at least one" can be used interchangeably herein. It is also to be noted that the terms "comprising", "including", and "having" can be used interchangeably.

"Automatic" and variations thereof refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

"Computer-readable medium" and variations thereof refer to any storage and/or transmission medium that participate in providing instructions to a processor for execution. Such a medium is commonly tangible and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

"Contact" and variations thereof refer to any voice, text, and/or video electronic communication, such as a voice call, E-mail, instant message, text chat, VoIP call, and the like. Contacts are generally pseudo-real-time or real-time contacts.

"Customer" or "client" and variations thereof denote a party patronizing, serviced by, or otherwise doing business with the enterprise A "database" and variations thereof refer to an organized set of data held in a computer. The organization schema or model for the data can, for example, be hierarchical, network, relational, entity-relationship, object, document, XML, entity-attribute-value model, star schema, object-relational, associative, multidimensional, multivalue, semantic, and other database designs.

"Determine", "calculate" and "compute," and variations thereof, are used interchangeably and include any type of methodology, process, mathematical operation or technique.

"Electronic address" and variations thereof refer to any contactable address, including a telephone number, instant message handle, e-mail address, Universal Resource Locator ("URL"), Universal Resource Identifier ("URI"), Address of Record ("AOR"), electronic alias in a database, like addresses, and combinations thereof.

An "electronic shopping cart" and variations thereof are an electronic commerce tool (software or service) that is a user-interface for the customer to shop at online stores. It allows customers to place items in a "shopping basket", and the cart remembers these items for a predetermined length of time. Extra features such as different color or size options, quantity of order, and matching item links can be found linked from the shopping cart. Once a customer inputs his shipping address, taxes and shipping costs can also be tallied from within the shopping cart. For the merchant, the shopping cart also provides important information, which is often transparent to the shopper including a cart number to track the order and a cookie to provide some limited tracking details about the customer.

"Instant message" and "instant messaging" and variations thereof refer to a form of real-time text communication between two or more people, typically based on typed text. The instant message is conveyed by an instant messaging program offered by a service, such as AOL™, MSN Messenger™, Yahoo! Messenger™, Live Messenger™, and Apple's iChat™. Generally included in the instant messaging software is the ability to see the presence of another party; that is, the ability to see whether a chosen friend, co-worker or other selected person (known as a "buddy") is online and connected through the selected service. Instant messaging differs from ordinary e-mail in the immediacy of the message exchange and also makes a continued exchange simpler than sending e-mail back and forth. Instant messaging, unlike e-mail, is also generally stateless. Most exchanges are text-only, though some services now allow voice messaging, file sharing and even video chat (when both users have cameras). For instant messaging to work, both users must be online at the same time and the intended recipient must be willing to accept instant messages. An attempt to send an instant message to someone who is not online (or is offline), or who is not willing to accept instant messages, will result in a notification that the transmission cannot be completed. If the online software is set to accept instant messages, it alerts the recipient with a distinctive sound and provides a window that collectively indicates that an instant message has arrived. The window allows the recipient to accept or reject the incoming instant message. An instant message session is deemed to disconnect, or be disconnected, when the user goes offline, refuses to accept an instant message, or is suspended by the user failing to respond to an instant message after a predetermined period of time after an instant message is sent and/or received. An instant message session is deemed to be reconnected (or a call-back deemed to occur) when the user resumes the instant messaging session, such as by responding to an outstanding instant message. While instant messaging is described in the context of a centralized server, it includes peer-to-peer direct instant messaging solutions.

"Means" shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

"Module" and variations thereof refer to any known or later developed hardware, software, firmware, artificial intelligence, fuzzy logic, or combination of hardware and software that is capable of performing the functionality associated with that element.

"Proficiency" and variations thereof refer to competence in, knowledge about, and/or familiarity with a selected subject, topic, and/or task. In the context of contact centers, a customer proficiency level can be considered to be similar in concept (or similar in approach) to a level of skill of an agent with respect to selected subject matter and/or completing a given task.

"Pseudo-Real-Time Contact" and variations thereof refer to a contact in which the contacting entity or customer is unable to abandon or disconnect the contact. Common examples include e-mail, fax, electronic or paper documents, webform submissions, voice messages, text-chat, instant messages, blogs, webchat, social network messages, and the like. Typically, a pseudo-real-time contact is a text-based communication.

"Real-Time Contact" and variations thereof refer to a contact in which the contacting entity or customer is present during the waiting (or queuing) period and can choose to abandon or disconnect the contact if the call is not serviced within an acceptable period. Common examples include voice calls, VoIP, video calls, and the like.

"Online chat" or "webchat" and variations thereof refer to any direct text-based and/or video-based (e.g., webcams), one-on-one chat or one-to-many group chat (formally also known as synchronous conferencing), using tools such as instant messengers, Internet Relay Chat (IRC), talkers and MUDs. Webchat typically offers a real-time direct transmission of text-based messages from sender to receiver, hence the delay for visual access to the sent message shall not hamper the flow of communications in any of the directions. Online chat may address point-to-point communications as well as multicast communications from one sender to many receivers and voice and video chat, or may be a feature of a web conferencing service. Online chat includes web-based applications that allow communication—often directly addressed, but anonymous between users in a multi-user environment. Web conferencing is a more specific online service, that is often sold as a service, hosted on a web server controlled by the vendor. While chat is described in the context of a centralized server, it includes peer-to-peer direct chat solutions.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

FIG. 2 depicts data structures in accordance with embodiments of the present disclosure;

DETAILED DESCRIPTION

The Contact Center

Figure 1:
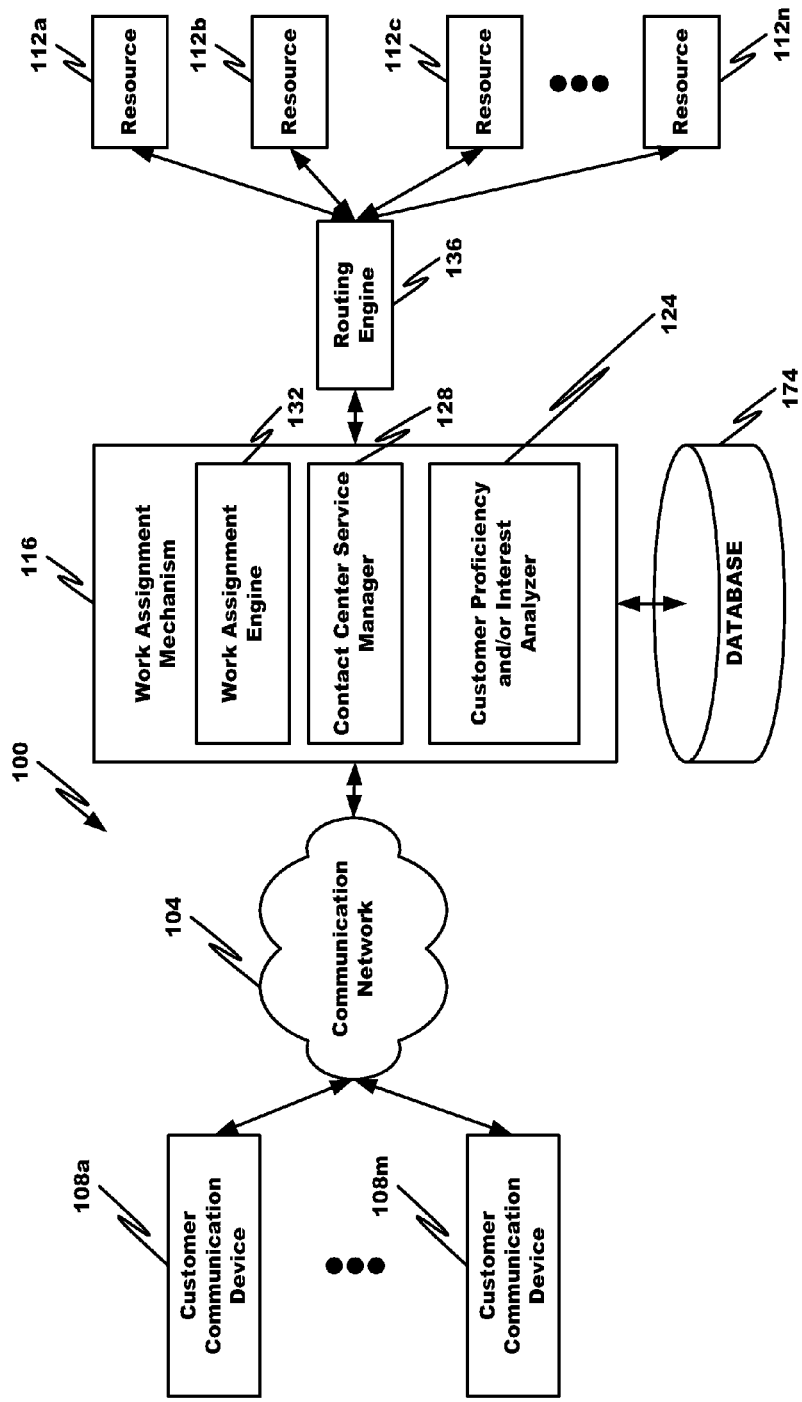
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more customer communication devices 108a-m to a work assignment mechanism 116, which may be operated by an enterprise administering a contact center in which a plurality of resources 112a-n are distributed to handle incoming work items (in the form of contacts (e.g., e-mail, fax, electronic or paper documents, webform submissions, voice messages, voice calls, VoIP calls, text chat, video calls, instant messages, and the like)) from the customer communication devices 108a-m.

The communication network 104 may comprise any type of known communication medium or collection of communication media and may use any type of protocols to transport messages between endpoints. The communication network 104 may include wired and/or wireless communication technologies. The Internet is an example of the communication network 104 that constitutes and Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in copending U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The customer communication devices 108a-m may comprise any type of known communication equipment or collection of communication equipment. Examples of a suitable communication device 108a-m include, but are not limited to, a personal computer, laptop, Personal Digital Assistant (PDA), cellular phone, smart phone, telephone, or combinations thereof. In general each communication device 108a-m may be adapted to support video, audio, text, and/or data communications with other communication devices 108a-m as well as the processing resources 112a-n. The type of medium used by the communication device 108a-m to communicate with other communication devices 108a-m or processing resources 112a-n may depend upon the communication applications available on the communication device 108a-m.

A customer may utilize their communication device 108a-m to initiate a work item, which is generally a request for a processing resource 112a-n. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and Ser. No. 12/707,277, filed Mar. 20, 1010, Feb. 17, 2010, and Feb. 17, 2010, respectively, each of which are hereby incorporated herein by reference in their entirety.

The work assignment mechanism 116 may employ any queue-based or queueless work assignment algorithm. Examples of queue-based work assignment skill-based algorithms include, without limitation, a fairness algorithm, pacing algorithm (which inserts rests into the agents work queue), value-based algorithms, limited algorithms (such as Business Advocate™ by Avaya, Inc.), and outsourcing algorithms. Other algorithms may consider other types of data inputs and/or may treat certain data inputs differently.

The format of the work item may depend upon the capabilities of the communication device 108a-m and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112a-n is assigned to the work item representing that communication at which point the work assignment mechanism 116 passes the work item to a routing engine 136 to connect the communication device 108a-m which initiated the communication with the assigned resource 112a-n.

Although the routing engine 136 is depicted as being separate from the work assignment mechanism 116, the routing engine 136 may be incorporated into the work assignment mechanism 116 or its functionality may be executed by the work assignment engine 132.

The contact center can include a database 174 to contain data structures associated with the enterprise operating the contact center, the customers and customer transactions of the contact center and/or enterprise, and contact center operation. A typical set of data structures for a work item include one or more of contact type code, media code (which identifies the type of media/medium used during the contact), contact ID (which uniquely identifies the contact), state ID (which identifies the state of the corresponding monitored endpoint to which the contact part corresponds), contact media interaction start datetime (the date/time that the contact media interaction started), party ID, business role code, party role start datetime, wait treatment ID, active media mask (a mapping of possible media types and their direction), UCID (Universal Call Identifier), contact datetime started (the date/time that the contact started), contact datetime stopped (the date/time that the contact stopped), observing call flag, trunk ID, contact routing method code, contact purpose code, routing construct ID, contact subject (a text description of the subject of the message), contact participation group ID, contact direction code, queue priority, data source ID, contact control indicator, state reason ID, calling number ID (the number dialed by the originator of the contact), and dialed number purpose ID.

The work item can be sent towards a collection of processing resources 112a-n via the combined efforts of the work assignment mechanism 116 and routing engine 136. The resources 112a-n can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116, database 174, and resources 112a-n may be owned and operated by a common entity in a contact center format. In some embodiments, the work assignment mechanism 116 may be administered by multiple enterprises, each of which has their own dedicated resources 112a-n connected to the work assignment mechanism 116.

Work Assignment Engine 132, Customer Proficiency and/or Interest Analyzer 124, and Contact Center Manager 128

The work assignment mechanism 116 can include a work assignment engine 132 which enables the work assignment mechanism 116 to make intelligent routing decisions for work items. In some embodiments, the work assignment engine 132 is configured to administer and make work assignment decisions in a queueless contact center, as is described in copending U.S. patent application Ser. No. 12/882,950, the entire contents of which are hereby incorporated herein by reference.

The work assignment engine 132 can determine which of the plurality of processing resources 112a-n is qualified and/or eligible to receive the work item and further determine which of the plurality of processing resources 112a-n is best suited (or is the optimal processing resource) to handle the processing needs of the work item. In situations of work item surplus, the work assignment engine 132 can also make the opposite determination (i.e., determine optimal assignment of a work item resource to a resource). In some embodiments, the work assignment engine 132 is configured to achieve true one-to-one matching by utilizing bitmaps/tables and other data structures.

The work assignment mechanism 116 can further include a contact center service manager 128 to select (such as from among multiple possible scripts) and/or configure a script to control an automated interaction with a customer associated with a corresponding work item. The script can be in the form of an interactive response unit appearing to the customer associated with the corresponding work item to be an entertaining trivia game or contest, of relevance to the products of the enterprise operating the contact center, in which the customer may be rewarded for correct answers with coupons, discounts, incentives, and/or other compensation. In other words, the questions provided to the customer during execution of the script are relevant to an operation, feature, use, design, and/or history of a product, product type, service, and/or service type (collectively "contact center product") offered by the enterprise associated with the contact center. The question may relate specifically to a current or past contact center product or generally to the type of current or past contact center product. In some cases, the question can relate to related products or services not offered by the contact center. For instance, if the enterprise were to sell a personal computer, laptop, or computer peripheral, the questions can be trivia about the history, design, or operation of a personal computer, laptop, or computer peripheral. An exemplary question would be: "Does a Blue-Ray disk have a greater capacity than a CD-ROM disk?" If the enterprise were to sell software, the questions can be trivia about the history, design or operation of software. An exemplary question would be: "Is javascript an implementation of the ECMAScript language?" Another exemplary question would be: "Are HTML, XML, and XHTML markup languages?" If the enterprise were to sell landscape supplies, the questions can be trivia about botany or landscape design. An example question would be: "Is a pansy considered to be a perennial in colder climates?"

While the obvious purpose of the game or contest is to encourage a customer associated with a work item to remain in queue, the game or contest can, by asking the right questions and optionally adjusting subsequent questions based on one or more prior responses by the customer, enable a customer proficiency and/or interest analyzer 124 to determine, such as by direct questions and/or reasonable inferences, about the customer's skill or knowledge (e.g., proficiency or proficiency level) respecting a specific product or type of product of the enterprise operating the contact center (e.g., a product domain) and/or customer interests relating to the product line of the enterprise. The ascertained proficiency and/or interest can then be used to route the work item to an appropriate resource (e.g., agent), to provide useful information to the assigned resource (e.g., agent) in servicing the work item, and to fine-tune product and/or price offers that might be made to the customer.

As will be appreciated, the game or contest can be configured simply as a diversion to kill time while the customer is in queue and/or awaiting service with the prize being simply a discount offered for answering one or more questions correctly. Any proficiency determined (e.g., x out of y correct) does not impact a change in routing. However, the system does capture the information that the user participated in the quiz and won a coupon. Rewards can be tiered for differing customer performance levels in the game or contest, e.g., a greater discount is awarded for more correct answers.

The contact center service manager 128 can collect and use contact center performance and/or selected work item information and/or contact center goals, policies, and/or objectives to determine: (a) whether a script is to be executed for the selected work item, (b) which script is to be executed, (c) how the selected script is to be configured, and/or (d) a suitable customer incentive for responding to the script, e.g., correctly answering a specified number of questions. Different incentives can be offered for correctly answering different numbers of questions.

Contact center performance information includes, for example, queue lengths, available resources, and/or contact center performance metrics. Contact center performance metrics include blockage (which indicates what percentage of customers will not be able to access the center at a given time due to insufficient network facilities in place), abandon rate (which measure the number of abandons as well as the abandon rate since both correlate with retention and revenues), service level and/or ASA (which is the percentage of contacts that are answered in a defined wait threshold, the most common speed of answer measure in the contact center, and most commonly stated as x percent of contacts handled in y seconds or less, while average speed of answer (ASA) represents the average wait time of all contacts in the period), first contact resolution rate (which is the percentage of transactions that are completed within a single contact, often called the "one and done" ratio or first contact resolution (FCR) rate, can be an important measure of quality, and gauges the ability of the center, as well as of an individual, to accomplish an interaction in a single step without requiring a transfer to another person or area, or needing another transaction at a future time to resolve the customer issue), transfer rate (which can be expressed as the transfer percentage and is an indication of how many contacts have to be transferred to another person or place to be handled), communication skills (which is degree to which general communications skills and etiquette are displayed by a resource and generally measured via observation or some form of quality monitoring as an individual gauge of performance), adherence to procedures (which measures a resource's adherence to procedures such as workflow processes or contact scripts), agent occupancy (which is a measure of actual time busy on customer contacts compared to available or idle time, is calculated by dividing workload hours by staff hours, and can be an important measure of how well the contact center has scheduled its staff and how efficiently resources are being used (e.g., if occupancy is too low, agents are sitting around idle with not enough to do and, if occupancy is too high, the personnel may be overworked)), AHT/ACW (which is a common measure of contact handling, the average handle time (AHT), made up of talk time plus after-contact work (ACW), and, to accommodate differences in contact patterns, normally measured and identified by time of day as well as by day of week), conversion rate (which refers to the percentage of transactions in which a sales opportunity is translated into an actual sale and can be measured as an absolute number of sales or as a percentage of contacts that result in a sale), average, expected, predicted, estimated, and/or actual wait time (of a work item for servicing), number of contacts accepted by an agent over a selected period of time, percentage utilization of a contact center resource, percentage realization of a contact center policy and/or goal, customer satisfaction (which is a measure of how satisfied a customer is with service previously or currently being provided), and up-sell/cross-sell rate (which refers to cost per contact or cost per minute to handle the contact workload). The foregoing contact center information and performance metrics can be used as qualifiers in assigning resources to service work items. As will be appreciated, this is not an exhaustive list, and other types of contact center information and/or performance metrics may also be employed. Any of the contact center information and/or performance metrics can be expressed as a percent realization compared to contact center goals, policies, and/or thresholds for the type of contact center information and/or performance metric.

Contact center goals, policies, and objectives include, for example, acceptable and unacceptable contact performance thresholds (for a contact center performance metric), contact center product sales goals by product or product type (which may require some products to be marketed more aggressively to customers by the contact center when compared to other products), and other rules.

Selected work item information includes, for example, customer personal information (e.g., customer name, family information, socioeconomic status, geographical location, occupation, contact information (e.g., associated electronic addresses), etc.), customer classification or category (e.g., gold, silver, bronze, etc.), customer business history with the enterprise operating the contact center and/or contact center, customer transaction history in prior contacts with the contact center, identity of script last completed by the customer, prior customer responses to previously completed scripts, previously assigned customer proficiency level(s) for selected product domain(s), previously determined customer interests, items currently associated with the work item (such as the contents of a virtual or electronic shopping cart or basket), and the capabilities of the customer communication device 108 associated with the customer and work item. An example of work item information is given by the data structures of FIG. 2.

The work assignment mechanism 116 can still further include a customer proficiency and/or interest analyzer 124 that executes the selected script and interacts with the customer associated with the selected work item. The customer proficiency and/or interest analyzer 124 collects and analyzes the responses not only to determine a proficiency and/or interest of the customer for a selected product domain but also to select subsequent questions in the script from among multiple optional and possible questions defined by the script. The analyzer 124 tags the responses with the customer identification and stores the responses in the database 174, thereby allowing the contact center to build a more complete picture of the customer associated with each work item and also allowing subsequent scripts to be selected based on a proficiency level more appropriate for the customer. Customer identification can take many forms, such as caller ID or other electronic address of the customer communication device 108 associated with the customer, an arbitrarily generated and assigned identification, a customer account number and the like.

An exemplary set of data structures will be discussed with reference to FIG. 2. The data structures for a customer associated with a customer identifier 200 include customer personal information 204, customer business history 208 with the enterprise operating the contact center and/or contact center, customer transaction history 212 in prior contacts with the contact center, identity of script 216 last completed by the customer, prior customer responses 220 to previously completed scripts, previously assigned customer proficiency level(s) 224 for a specified contact center product domain, previously determined customer interests 228, items currently associated with the work item 232, and prior earned coupons, discounts, rewards or other customer incentives 236 from participating in prior scripts. Prior earned coupons, discounts, rewards or other customer incentives 236 include not only previously used and expired but also outstanding (or banked and unused) coupons, discounts, rewards or other customer incentives.

The work assignment engine 132 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

Contact Center Operation

Figure 3:
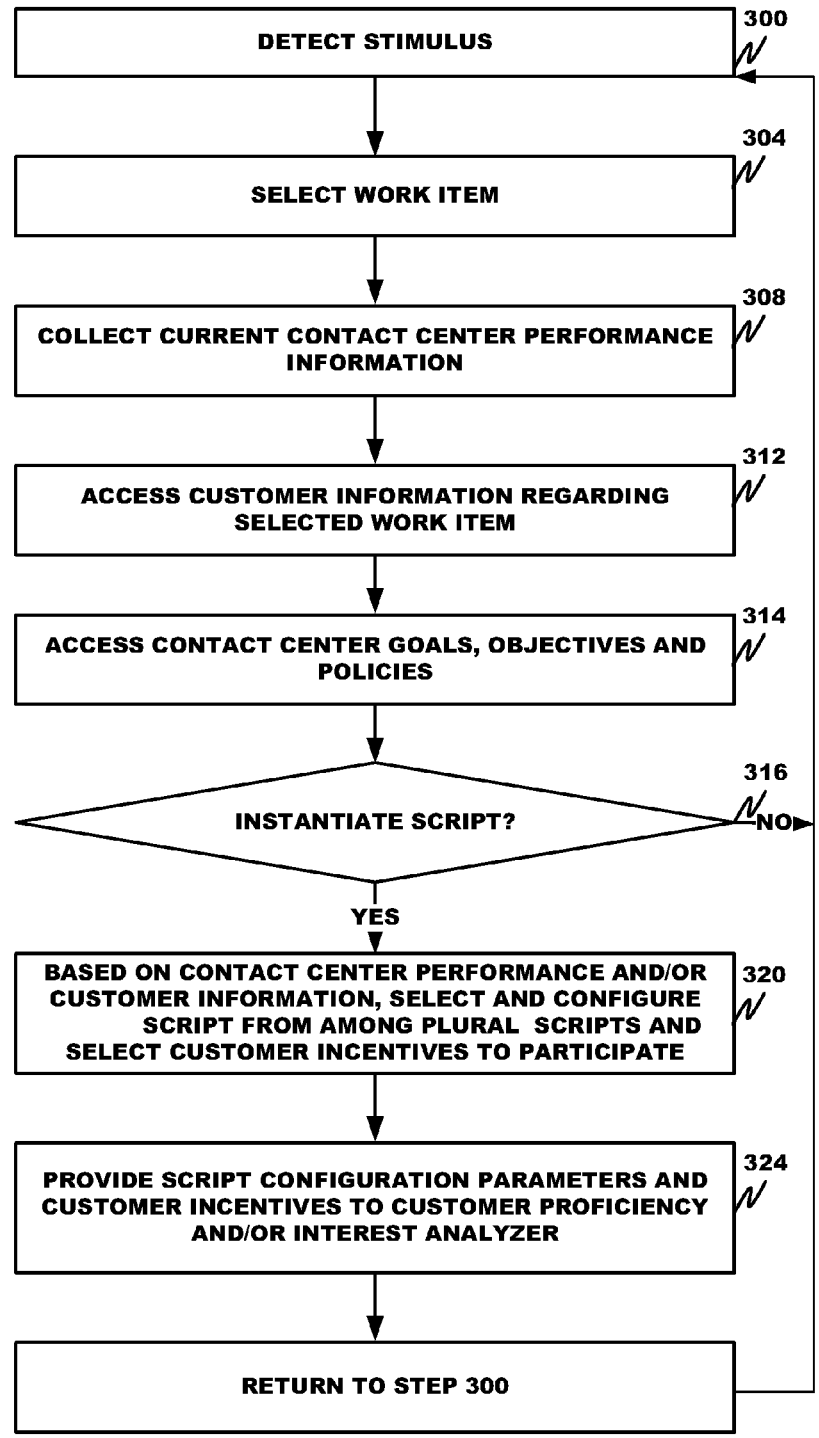
FIG. 3 depicts a flow diagram in accordance with embodiments of the present disclosure.

Referring to FIG. 3, operation of the contact center service manager 128 will be discussed.

In step 300, the contact center service manager 128 detects a stimulus. Exemplary stimuli include receipt and/or placement in a work item queue of a work item, a change in state of the contact center, a predetermined change in a contact center performance metric, detection of specific item values in the work item data structures (such as a specific customer identifier), and the like.

In step 304, the contact center service manager 128 selects an enqueued work item.

In step 308, the contact center service manager 128 collects current contact center performance information; in step 312, accesses customer information regarding the selected work item or the customer associated with the work item (e.g., the data structures of FIG. 2); and in step 314, accesses contact center goals, objectives and policies.

In decision diamond 316, the contact center service manager 128 determines whether or not to instantiate a script with respect to the selected work item. A script may not be executed for the selected work item when, for example, a resource, particularly a human agent, is currently or shortly available to service the work item, when the customer associated with the work item declines to participate in the script, and when no additional proficiency or customer interest information is required for the customer associated with the work item.

The customer decision to decline to participate in the script (e.g., game or contest) normally does not impact the customer's work item queue position in the wait queue; that is, it does not impact how quickly the work item is serviced by a resource. Because useful information is acquired by the contact center via the (trivia) questions in the game or contest, there may be circumstances in which the contact center would find it beneficial to keep customer contestants, or game or contest participants, in a queue longer than the non-participants. Similarly, if the game or contest is genuinely entertaining and regarded by customers as a positive experience (possibly because the customer is building up credits toward a purchase), the contact center may want to defer customer service by an agent until the game or contest is completed. In other words, the customer himself would tell the contact center when the customer is ready for servicing, particularly where the customer's queue position advances to the head of the queue while the customer is playing the game or contest. The customer's queue position could be held at the head of the queue until the customer indicates that he or she is ready for service. At that point, the customer's work item would be first-in-line for the next available agent. An example of how this could be implemented is that the customer participating in the game or contest would be notified when an agent is available and asked whether he or she wants to continue with the contest. If the customer were to answer negatively, the customer's work item is held at the head of the queue until the customer indicates that he or she is ready for service. If the customer were to answer positively, the game or contest is terminated and the customer's work item is assigned to a next available agent for servicing.

When a script is to be instantiated, the contact center manager 128, in step 320, selects, from among multiple scripts, and configures, based on contact center performance and/or goals, objectives, and/or policies, and/or customer information, a script and customer incentives to participate in the script. A script can be selected from among multiple scripts (with each script being associated with a particular customer proficiency level and/or product domain) or the script may be configured from a master script that is generic to all proficiency levels and/or product domains. In the former case, the proficiency level is the highest script level completed with an acceptable score by the customer. Each script is typically associated with a specific proficiency level and/or selected product domain. In the latter case, the proficiency level is mapped to the particular route followed and completed successfully by the customer through the logic tree of the script. In other words, each master script has multiple possible navigation routes through its associated logic tree, with the particular route navigated by a particular customer being dependent on which questions are answered correctly or incorrectly by the customer. Each route is associated with a corresponding proficiency level for a selected product domain.

A particular script to be executed can be selected from among multiple possible scripts, for instance, based on customer type or category, contact center performance information, contact center goals, objectives, and policies, customer information regarding the selected work item (e.g., customer identifier 200, customer personal information 204, customer business history 208, and customer transaction history 212), script ID 216 (or the script(s) previously completed by the customer associated with the selected work item), previous customer responses 220, previously assigned customer product proficiency level(s) 224 and/or interests 228, and/or items associated with the selected work item 232. For example, the script can be selected by mapping products to be marketed aggressively by the contact center to the product proficiency level(s) and/or interests of the customer.

The configuration of the selected script, such as a script length or duration (e.g., how many and what type of questions are to be in the script) and an access channel (e.g., telephone, text chat, instant messaging, Web browser, email, and the like) by which the script is to interact with the customer can be based, for instance, not only on the capabilities of the customer communication device 108 associated with the customer and work item but also one or more of customer type or category, contact center performance information (e.g., estimated or predicted wait time for the selected work item when compared to an estimated time required to complete each of the scripts), scripts previously completed by the customer associated with the selected work item, previous responses of the customer, previously assigned customer product proficiency level(s) and/or interests, and/or items associated with the selected work item.

A suitable customer incentive for responding to the selected script, for instance, can depend on customer type or category, contact center performance information, contact center goals, objectives, and policies, customer information regarding the selected work item (e.g., customer identifier 200, customer personal information 204, customer business history 208, and customer transaction history 212), script ID 216 (or the script(s) previously completed by the customer associated with the selected work item), previous customer responses 220, previously assigned customer product proficiency level(s) 224 and/or interests 228, items associated with the selected work item 232, and/or prior earned incentives 236. Prior earned incentives 236 can be particularly relevant as the customer's behavior towards previously earned incentives (whether, when, and how used, how quickly used, and the like) can indicate which types of incentives the customer would find more valuable.

In one configuration, rewards earned during execution of the script are product-specific coupons, or pricing discounts oriented towards the customer's product proficiency level and/or interests. A more sophisticated version of this configuration would allow customers to choose the incentive(s) from among a variety of incentive(s) that are assumed to be of interest. The benefit of this approach is that it can lead to a happier customer while providing explicit (rather than inferred) information to the contact center about the customer's interests.

In one configuration, previously earned incentives can be banked for future use, thereby encouraging the customer to be a repeat customer. Alternatively, the earned incentives must be used during the same session in which they are earned, thereby encouraging the customer to acquire merchandise immediately.

In step 324, the contact center manager 128 provides the script configuration parameters and customer incentives to the customer proficiency and/or interest analyzer 124.

After step 324 or when no script is to be instantiated (decision diamond 316), the contact center manager 128 returns to step 300.

Figure 4:
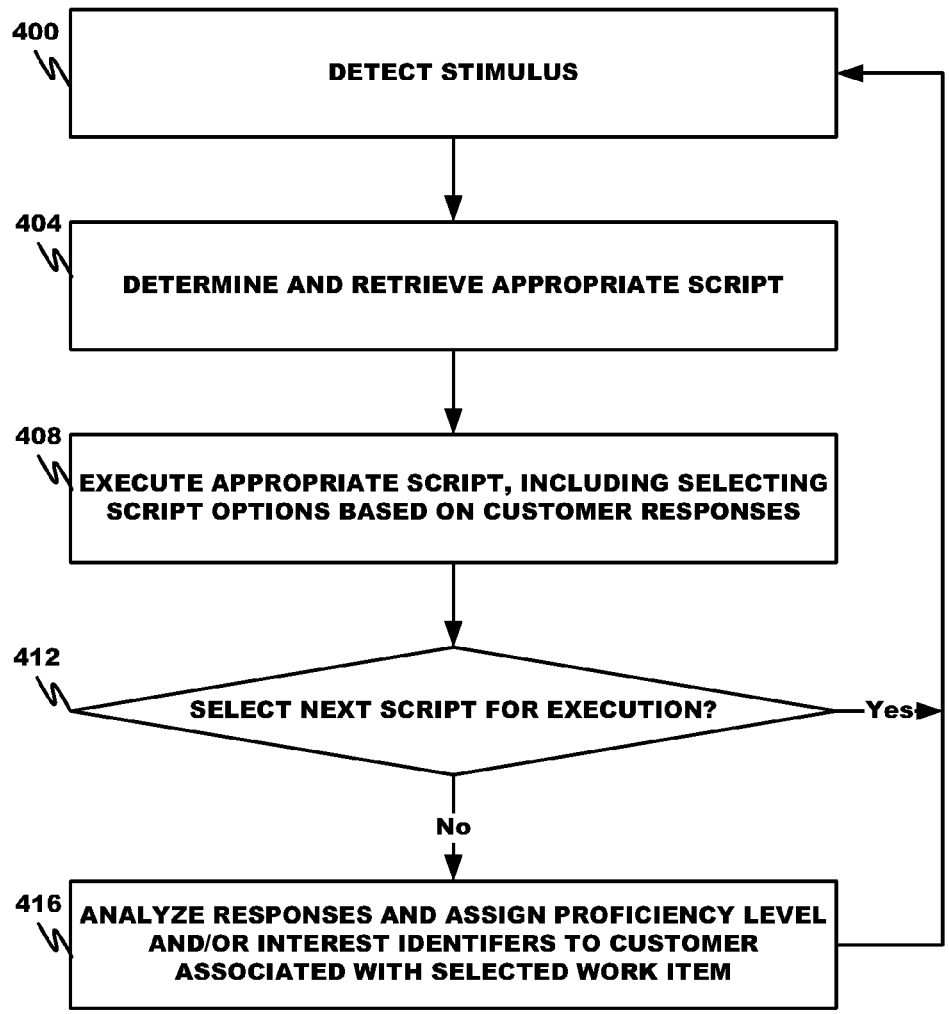
FIG. 4 depicts flow diagram in accordance with embodiments of the present disclosure.

With reference to FIG. 4, the operation of the customer proficiency and/or interest analyzer 124 will be discussed.

In step 400, the customer proficiency and/or interest analyzer 124 detects a stimulus. Exemplary stimuli include receipt, from the contact center manager 128, of the script configuration parameters and customer incentives.

In step 404, the customer proficiency and/or interest analyzer 124 determines and retrieves the appropriate script for execution.

In step 408, the customer proficiency and/or interest analyzer 124 executes the appropriate script, including selecting script options based on customer responses. As will be appreciated, a script can have, for each node in its logic tree, one or more options to choose from. The options can be associated with a specific response or type of response to a preceding question. In this manner, the customer proficiency and/or interest analyzer 124 navigates its way through the logic tree until the script is executed fully or the selected script duration expires.

In step 412, the customer proficiency and/or interest analyzer 124 determines, by querying the contact center manager 128, whether a next script is to be executed and, if so, an identity of the script.

When a next script is not to be executed, the customer proficiency and/or interest analyzer 124, in step 416, analyzes the customer's responses and assigns a proficiency level and/or interest identifiers to the customer associated with the selected work item and causes the customer's set of data structures (FIG. 2) to be updated accordingly.

After completing step 416 or when a further script is to be executed (decision diamond 412), the customer proficiency and/or interest analyzer 124 returns to step 400.

Figure 5:
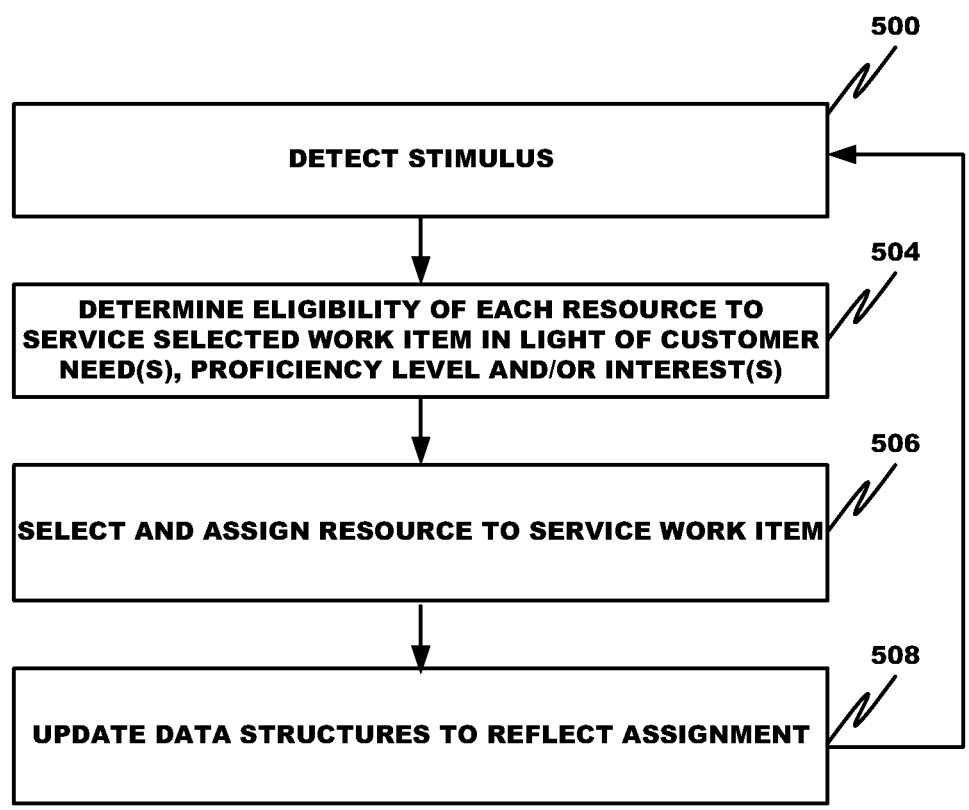
FIG. 5 depicts flow diagram in accordance with embodiments of the present disclosure.

With reference to FIG. 5, the operation of the work assignment engine 132 and routing engine 136 will be described.

The work assignment engine 132 detects a stimulus in step 500. Exemplary stimuli include a work item reaching a head of a work item queue and a resource becoming available for assignment of a next work item.

In step 504, the work assignment engine 132 determines an eligibility of each resource to service the selected work item in light of the customer's need(s), proficiency level, and/or interests.

As will be appreciated, the resources are commonly assigned to resource queues. The resource queues have multiple queue positions or slots and correspond to a different set of agent skills. Each resource's skills are prioritized according to his or her level of expertise in that skill, and either agents are enqueued in individual ones of agent queues in their order of expertise level and/or are enqueued in different ones of a plurality of agent queues that correspond to a skill and each one of which corresponds to a different expertise level. Contacts incoming to the contact center are assigned, such as by a work item vector, to different work item queues based upon one or more work item qualifiers. As used herein, a qualifier (such as those referenced below) refers to an attribute assigned to a contact that determines, at least in part, to which work item queue the corresponding contact is forwarded (or to which class of service the contact is assigned). Resources who are available for handling contacts are assigned to resource queues based upon the skills that they possess. A resource may have multiple skills, and hence may be assigned to multiple agent queues simultaneously. Furthermore, an agent may have different levels of skill expertise (e.g., skill levels 1-N in one configuration or merely primary skills and secondary skills in another configuration), and hence may be assigned to different resource queues at different expertise levels.

As an example, a customer who is able to answer no questions or only simple questions might be routed to an agent who is good at hand-holding and skilled at providing introductory support. At the other end of the spectrum, a customer who appears to have a strong background might be routed to an agent having superior knowledge and expertise. Similarly, when the customer's interests can be identified by the script responses, routing to an agent with expertise in those areas would be feasible.

Once a resource is identified that is eligible to service the selected work item, the work assignment engine 132, in step 506, selects and assigns the resource to service the work item.

The routing engine 136 routes the work item to the resource, and the work assignment engine 132, in step 508, updates the data structures to reflect the assignment.

The data structures of FIG. 2 are commonly provided to the agent to assist the agent in servicing the work item. In particular, the customer responses 220 and customer product proficiency level(s) 224 can be especially informative to the agent servicing the work item.

The exemplary systems and methods of this disclosure have been described in relation to distributed processing systems. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

For example in one alternative embodiment, the interactive response unit is used not simply as an interactive voice response unit but for channels other than voice. For instance, the interactive response unit can interact with a customer in a text-based session, such as instant messaging and/or email, and/or in a browser-based session.

In yet another embodiment, customer product proficiency is determined by other techniques, such as by analyzing one or more of the data structures of FIG. 2.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   selecting, by a microprocessor executing a work assignment mechanism, a work item associated with a respective customer having a customer identification;
   determining, by the microprocessor executing the work assignment mechanism and for the respective customer, a customer proficiency level with respect to a contact center product and/or product area sold and/or serviced by a contact center, wherein the microprocessor determines the customer proficiency level by providing the respective customer with a game and/or contest, wherein the game and/or contest is provided by the microprocessor executing a script, wherein the microprocessor executable work assignment mechanism, when executed by the microprocessor, collects and analyzes responses to determine the customer proficiency level of the respective customer and/or to select subsequent questions in the script to be executed from among multiple optional and/or possible questions defined by the script, wherein the microprocessor executable work assignment mechanism, when executed by the microprocessor, tags the responses with the customer identification and stores the responses in a database, thereby allowing the microprocessor executable work assignment mechanism, when executed by the microprocessor, to build a more complete picture of the respective customer and also allowing subsequent scripts to be selected for execution based on a proficiency level more appropriate for the respective customer; and
   the microprocessor, executing the work assignment mechanism, uses the customer proficiency level in assigning the selected work item to a resource for servicing.

2. The method of claim 1, wherein the work item is a Real-Time or Pseudo-Real-Time contact, wherein the game and/or contest is provided through the microprocessor executing a selected script, wherein the selected script is selected from among multiple scripts or results from a selected logical route through a master script based on questions answered correctly or incorrectly by the respective customer, and wherein the assigned resource is a human agent.

3. The method of claim 1, wherein the work item is a Real-Time or Pseudo-Real-Time contact, wherein the work assignment mechanism, when executed by the microprocessor, provides the determined customer proficiency level to the assigned resource for use in servicing the work item, wherein the game and/or contest is provided through the microprocessor executing a selected script, wherein the selected script is selected from among multiple scripts or results from a selected logical route through a master script based on questions answered correctly or incorrectly by the respective customer, and wherein the assigned resource is a human agent.

4. The method of claim 1, wherein the assigned resource is a human agent, wherein the customer proficiency level is determined by the microprocessor executing the script while the respective customer is awaiting service by the agent, wherein the script is configured as a trivia game, and wherein the respective customer receives a benefit for answering a selected number of questions correctly.

5. The method of claim 1, wherein the assigned resource is a human agent, wherein the microprocessor determines the customer proficiency level by executing the script while the respective customer is awaiting service by the agent, wherein, based on one or more of contact center performance information, goal, policy, and/or objective, and/or work item information, the work assignment mechanism, when executed by the microprocessor, determines one or more of: (a) whether or not to perform the determining step; (b) an identity of a script to be executed; (c) a configuration of the script; and/or (d) a benefit given to the respective customer for completing successfully questions provided by the script, when executed by the microprocessor, wherein the contact center performance information is one or more of a queue length, available resource, and/or contact center performance metric, and wherein the work item information comprises one or more of an identifier of a script successfully completed by the respective customer, a prior response of the respective customer to a script, the customer proficiency level, a contact center product associated with the selected work item, and/or a prior earned incentive, and wherein the determination of the one or more of: (a) whether or not to perform the determining step; (b) an identity of a script to be executed; (c) a configuration of the script; and/or (d) a benefit given to the respective customer for completing successfully questions provided by the script, when executed by the microprocessor, is determined based on a selected contact center product currently being marketed by the contact center.

6. The method of claim 5, wherein, based on the one or more of contact center performance information, goal, policy, objective, and/or work item information, the work assignment mechanism, when executed by the microprocessor, determines the identity of a script to be executed.

7. The method of claim 5, wherein, based on the one or more of contact center performance information, goal, policy, objective, and/or work item information, the work assignment mechanism, when executed by the microprocessor, determines the configuration of the script.

8. The method of claim 5, wherein, based on the one or more of contact center performance information, goal, policy, objective, and/or work item information, the work assignment mechanism, when executed by the microprocessor, determines the benefit given to the respective customer for completing successfully questions provided by the script.

9. The method of claim 1, wherein one or more of the following is true: (a) the script is selected by the microprocessor from among multiple scripts, with each script being associated with a particular customer proficiency level, wherein the customer proficiency level is the highest script level completed by the respective customer with an acceptable score and each script is associated with a specific proficiency level and/or (b) the script to be executed by the microprocessor is configured from a master script that is generic to all proficiency levels, wherein the customer proficiency level is mapped to a particular route followed and completed successfully by the respective customer through a logic tree of the script executed by the microprocessor and each master script has multiple possible navigation routes through its associated logic tree, with the particular route navigated by a particular customer being dependent on which questions are answered correctly or incorrectly by the particular customer.

10. The method of claim 1, wherein the game and/or contest is the game.

11. A system, comprising:
    a microprocessor;

a computer readable medium, coupled to the microprocessor, to store, for a plurality of contact center customers, a corresponding customer proficiency level;

a microprocessor executable routing engine that, when executed by the microprocessor routes work items to agent communication devices for servicing, each of the work items being a customer contact received by a contact center; and a microprocessor executable work assignment mechanism that, when executed by the microprocessor:

selects a work item associated with a respective customer having a customer identification;

determines, for the respective customer, a customer proficiency level with respect to a contact center product and/or product area sold and/or serviced by a contact center, wherein the microprocessor determines the customer proficiency level by providing the respective customer with a game and/or contest, wherein the game and/or contest is provided by the microprocessor executing a script, wherein the microprocessor executable work assignment mechanism, when executed by the microprocessor, collects and analyzes responses to determine the customer proficiency level of the respective customer and/or to select subsequent questions in the script to be executed from among multiple optional and/or possible questions defined by the script, wherein the microprocessor executable work assignment mechanism, when executed by the microprocessor, tags the responses with the customer identification and stores the responses in a database, thereby allowing the microprocessor executable work assignment mechanism, when executed by the microprocessor, to build a more complete picture of the respective customer and also allowing subsequent scripts to be selected for execution based on a proficiency level more appropriate for the respective customer; and uses the customer proficiency level to select an agent to service the selected work item and causes the microprocessor executable routing engine to route the selected work item to an agent communication device corresponding to the selected agent for servicing.

12. The system of claim 11, wherein the work item is a Real-Time or Pseudo-Real-Time contact, wherein the game and/or contest is provided by the microprocessor executing a selected script, and wherein the selected script is selected from among multiple scripts or results from a selected logical route through a master script based on questions answered correctly or incorrectly by the respective customer.

13. The system of claim 11, wherein the work item is a Real-Time or Pseudo-Real-Time contact, wherein the work assignment mechanism, when executed by the microprocessor, provides the determined customer proficiency level to the selected agent for use in servicing the selected work item, and wherein the game and/or contest is provided by the microprocessor executing a selected script, wherein the selected script is selected from among multiple scripts or results from a selected logical route through a master script based on questions answered correctly or incorrectly by the respective customer.

14. The system of claim 11, wherein the customer proficiency level is determined by the microprocessor executing the script while the respective customer is awaiting service by the selected agent, wherein the script is configured as a trivia game, and wherein the respective customer receives a benefit for answering a selected number of questions correctly.

15. The system of claim 11, wherein the microprocessor determines the customer proficiency level by executing the script while the respective customer is awaiting service by the selected agent, wherein, based on one or more of contact center performance information, goal, policy, objective, and/or work item information, the work assignment mechanism, when executed by the microprocessor, determines one or more of: (a) whether or not to perform the determining operation; (b) an identity of a script to be executed; (c) a configuration of the script; and/or (d) a benefit given to the respective customer for completing successfully questions provided by the script, when executed by the microprocessor, wherein the contact center performance information is one or more of a queue length, available resource, and/or contact center performance metric, and wherein the work item information comprises one or more of an identifier of a script successfully completed by the respective customer, a prior response of the respective customer to a script, a customer proficiency level, a contact center product associated with the selected work item, and/or a prior earned incentive, and wherein the determination of the one or more of: (a) whether or not to perform the determining operation; (b) an identity of a script to be executed; (c) a configuration of the script; and/or (d) a benefit given to the respective customer for completing successfully questions provided by the script, when executed by the microprocessor, is determined based on a selected contact center product currently being marketed by the contact center.

16. The system of claim 15, wherein, based on the one or more of contact center performance information, goal, policy, objective, and/or work item information, the work assignment mechanism, when executed by the microprocessor, determines the identity of the script to be executed.

17. The system of claim 15, wherein, based on the one or more of contact center performance information, goal, policy, objective, and/or work item information, the work assignment mechanism, when executed by the microprocessor, determines the configuration of the script.

18. The system of claim 15, wherein, based on the one or more of contact center performance information, goal, policy, objective, and/or work item information, the work assignment mechanism, when executed by the microprocessor, determines the benefit given to the respective customer for completing successfully questions provided by the script.

19. The system of claim 11, wherein one or more of the following is true: (a) the script is selected by the microprocessor from among multiple scripts, with each script being associated with a particular customer proficiency level, wherein the customer proficiency level is the highest script level completed by the respective customer with an acceptable score and each script is associated with a specific proficiency level and/or (b) the script to be executed by the microprocessor is configured from a master script that is generic to all proficiency levels, wherein the customer proficiency level is mapped to a particular route followed and completed successfully by the respective customer through a logic tree of the script executed by the microprocessor and each master script has multiple possible navigation routes through its associated logic tree, with the particular route navigated by a particular customer being dependent on which questions are answered correctly or incorrectly by the particular customer.

20. The system of claim 11, wherein the game and/or contest is the game.

* * * * *

UNITED STATES PATENT AND TRADEMARK OFFICE
CERTIFICATE OF CORRECTION

PATENT NO. : 9,654,638 B2  
APPLICATION NO. : 13/953424  
DATED : May 16, 2017  
INVENTOR(S) : Harvey S. Waxman and Paul Roller Michaelis Page 1 of 1

It is certified that error appears in the above-identified patent and that said Letters Patent is hereby corrected as shown below:

At Column 20, Line 6, after "policy," delete "and/or" therein.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*